United States Patent [19]

Da Re'

[11] Patent Number: 5,044,915
[45] Date of Patent: Sep. 3, 1991

[54] APPARATUS FOR THE INJECTION MOULDING OF UNSATURATED POLYESTER RESIN MASSES

[75] Inventor: Mario Da Re', Turin, Italy

[73] Assignee: Fiat Auto S.p.A., Turin, Italy

[21] Appl. No.: 483,980

[22] Filed: Mar. 30, 1990

Related U.S. Application Data

[63] Continuation-in-part of Ser. No. 251,424, Sep. 30, 1988, abandoned.

[30] Foreign Application Priority Data

Sep. 30, 1987 [IT] Italy .................... 67827 A/87

[51] Int. Cl.$^5$ .................... B29C 35/12; B29C 45/72
[52] U.S. Cl. .................... 425/174.8 R; 264/26; 425/174.8 E; 425/547; 425/557; 425/543
[58] Field of Search .......... 264/25, 26, 328.4, 328.14; 425/174, 174.8 R, 174.8 E, 547, 543, 557

[56] References Cited

U.S. PATENT DOCUMENTS

| | | | |
|---|---|---|---|
| 2,370,883 | 3/1945 | Smith | 425/174.8 R |
| 2,386,966 | 10/1945 | MacMillin | 425/174.8 R |
| 2,436,999 | 3/1948 | MacMillin et al. | 425/174.8 R |
| 2,443,594 | 6/1948 | Boettler et al. | 425/174.8 R |
| 2,448,676 | 9/1948 | MacMillin et al. | 264/26 |
| 2,505,602 | 4/1950 | Bertrand | 425/174.8 R |
| 2,608,637 | 8/1952 | Dakin et al. | 425/174.8 R |
| 4,678,421 | 7/1987 | Kai et al. | 425/557 |

FOREIGN PATENT DOCUMENTS 454251  1/1949  Canada .................... 425/174.8 R Primary Examiner—Jay H. Woo
Assistant Examiner—James P. Mackey
Attorney, Agent, or Firm—Sughrue, Mion, Zinn, Macpeak & Seas

[57] ABSTRACT

A method for the injection moulding of unsaturated polyester resin masses includes the steps of compacting the moulding mass in an accumulation cylinder, generating a subatmospheric pressure in the cylinder and heating the compacted mass at subatmospheric pressure by the application of a high-frequency load as it passes between the inner wall of a hollow metal cylinder and a coaxial spaced cylindrical electrode and injecting the material into the die. The apparatus for carrying out the method includes an accumulation cylinder of metal having a coaxial cylindrical electrode mounted therein to define a substantially hollow cylindrical passage for the flow of the resin mass. A generator is connected to the electrode to generate high frequency waves to heat the resin mass passing over the electrode.

1 Claim, 2 Drawing Sheets

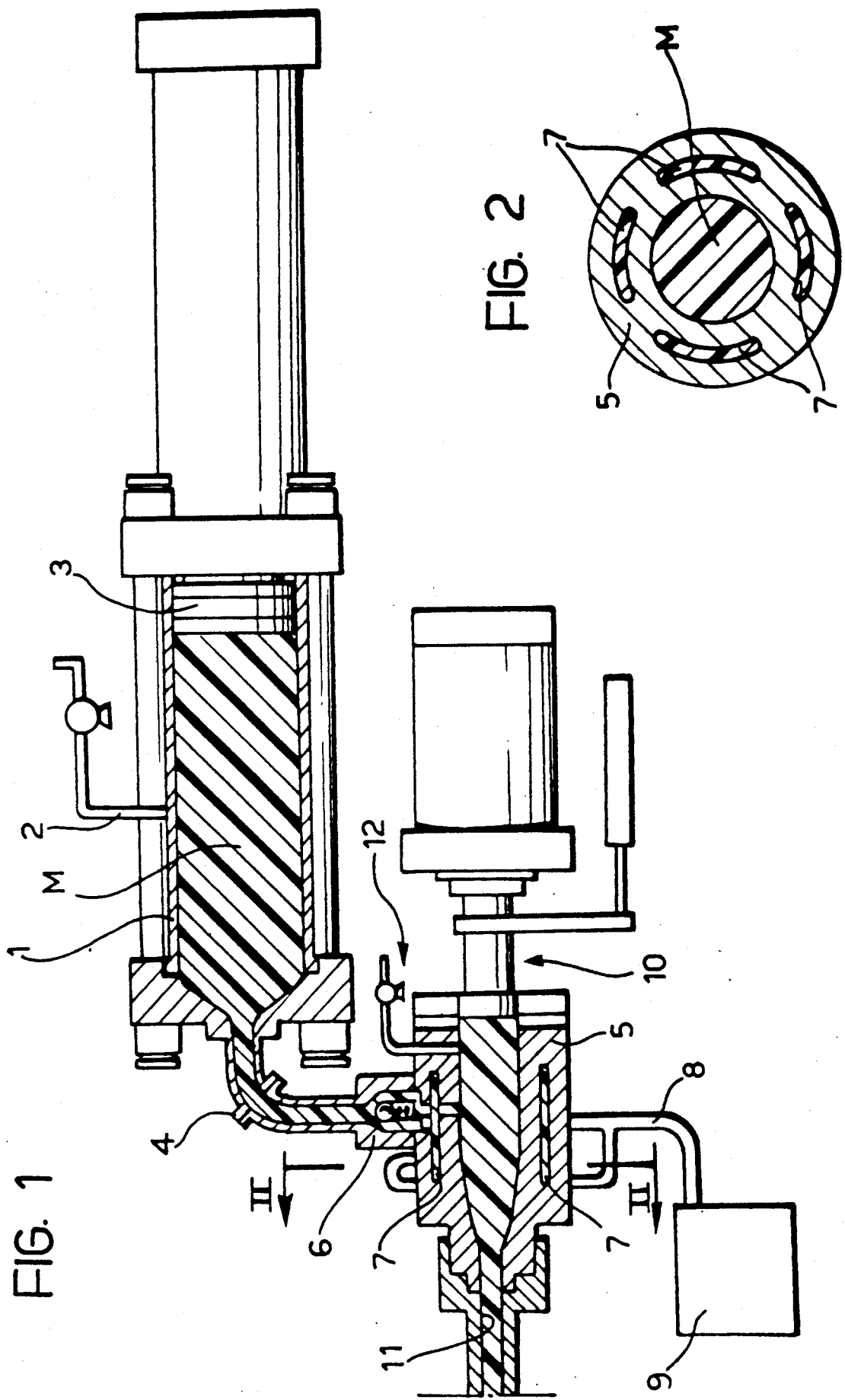

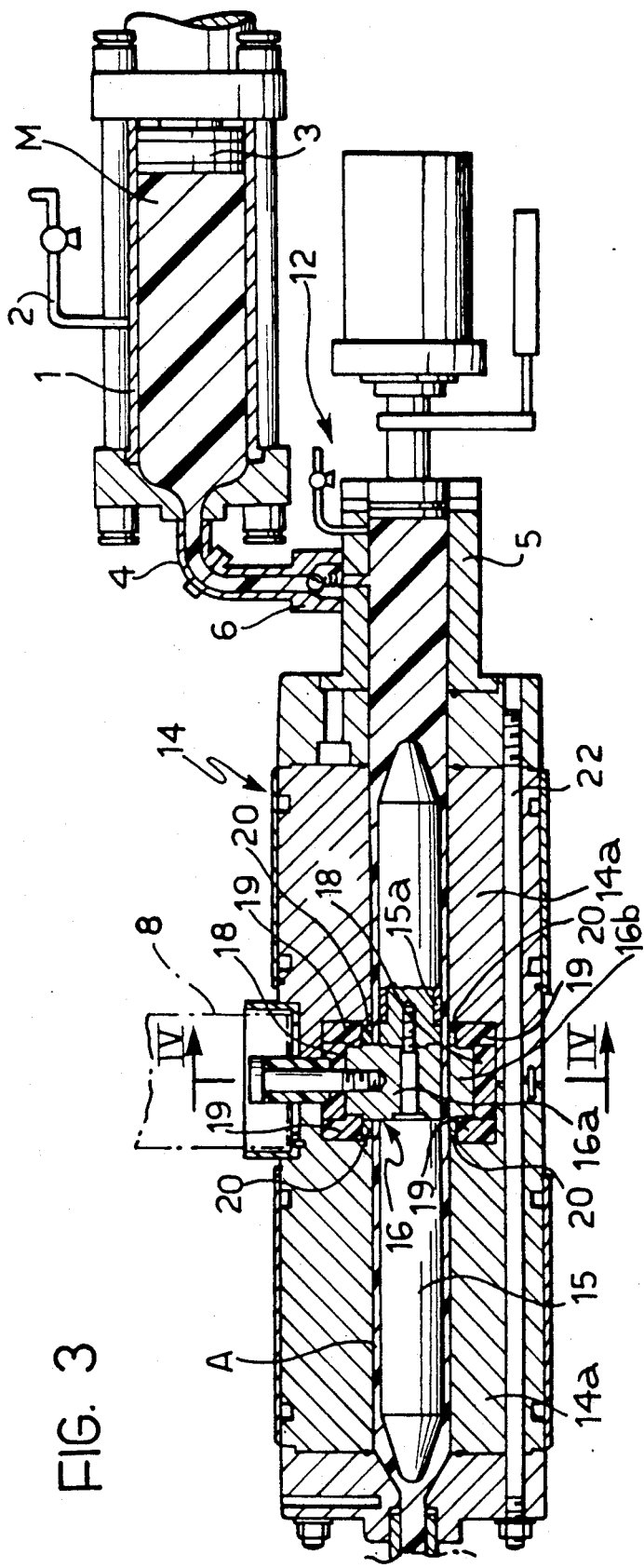
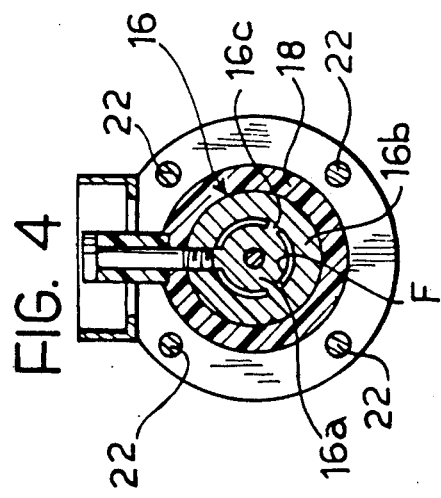

APPARATUS FOR THE INJECTION MOULDING OF UNSATURATED POLYESTER RESIN MASSES

CROSS-REFERENCE TO RELATED APPLICATION

The present application is a continuation in part of application Ser. No. 07/251,424, filed Sept. 30, 1988.

BACKGROUND OF THE INVENTION

The present invention relates to a method and apparatus for the injection molding of unsaturated polyester resin masses, possibly reinforced with fibers.

The transformation of reinforced, unsaturated polyester resin compounds for the production of molded articles is generally carried out by the introduction of the molding mass which is almost at ambient temperature, generally between 140° and 180°. The time necessary for the material to reach the correct polymerization temperature greatly limits the productivity of the molding plant and may sometimes have an adverse effect on the homogeneity of the results.

In injection molding in which the material is introduced into the die through a ramming unit, the preheating of the material is particularly problematical since there is a risk that the material will polymerize before injection.

SUMMARY OF THE INVENTION

The object of the present invention is to provide an improved method which enables the productivity to be increased, reduces the molding times, and at the same time achieves improved results in terms of the homogeneity of the structural characteristics of the injection-molded article.

According to the invention, this object is achieved by means of a method characterized in that it comprises the steps of compacting the molding mass in an accumulation cylinder which is substantially isolated from the outside atmosphere, generating a subatmospheric pressure in the cylinder containing the compacted mass and heating the compacted mass at subatmospheric pressure to a temperature close to its cross-linking temperature by the application of high frequencies, and injecting the mass into the die.

A further subject of the invention is constituted by injection and ramming equipment for the injection molding of unsaturated polyester resin masses, possibly reinforced with fibers, including a metering cylinder provided with a piston for supplying the mass of material to an accumulation cylinder provided with a piston for injecting the mass into the die, and characterized in that the accumulation cylinder is constituted by a body of molded plastics material transparent to radio frequencies, whose walls incorporate electrode plates connected to a high-frequency generator for creating a high-frequency field in the mass of material so as to heat it to a temperature close to its cross-linking temperature.

BRIEF DESCRIPTION OF THE DRAWINGS

Further characteristics and advantages of the method and apparatus according to the invention will become clear from the detailed description which follows with reference to the appended drawings, in which:

FIG. 1 is a partially-sectioned schematic view of injection-ramming apparatus for carrying out the method according t the invention;

FIG. 2 is a section taken on the line II—II of FIG. 1;

FIG. 3 is a partially-sectioned schematic view of an injection-ramming apparatus for carrying out the method according to the invention according to a second embodiment; and FIG. 4 is a section taken on the line IV-IV of FIG. 3.

DETAILED DESCRIPTION OF THE INVENTION

With reference to the drawings an injection and u ramming unit comprises a metering-plasticizing cylinder 1 into which a mass M of fiber-reinforced unsaturated polyester resin, typically BMC, is introduced. The metering cylinder is provided with a connector 2 for connecting the inner chamber to a vacuum pump for creating a subatmospheric pressure within the cylinder to evacuate the air contained in the molding mass. A metering piston 3 is associated with the cylinder and provides for the supply of the material through an elbow duct 4 into an accumulation cylinder 5 through an opening in its side wall. A non-return valve 6 is interposed between the accumulation cylinder and the duct. The molding mass is preferably kept in the metering cylinder at almost ambient temperature and the material is supplied to the accumulation cylinder with a piston flow if possible, avoiding localized overheating of the molding mass.

The accumulation cylinder 5 is constituted by a tubular body of plastics material which is transparent to radio frequencies, typically PTFE or another suitable material. Electrode plates 7 are incorporated in the cylindrical wall of the accumulation chamber and are connected to a high-frequency generator 9 by a coaxial cable 8. Preferably, there are four electrode plates 7 with arcuate cross-sectional profiles, and these are arranged in facing pairs so as to generate a more or less uniform radio-frequency field within the accumulation cylinder. An injection piston 10 is associated with the accumulation cylinder and provides for the compaction and then the direct injection of the material into the die through an orifice 11 in the accumulation chamber. The accumulation chamber is preferably provided with a connector 12 for its connection to a vacuum pump for creating a subatmospheric pressure in the inner chamber.

According to a preferred embodiment shown in FIGS. 3 and 4, the pre-heating unit comprises a metal tubular element 14 comprising two tubular half-elements 14a which are connected together and to the accumulation cylinder 5 by means of bolts 22.

Between the two tubular half-elements in the front connection zone thereof, electrically insulating rings 18, 19 and 20 are mounted which centrally support a metal cylinder 16 having a central portion 16a which is linked to a peripheral ring 16b by means of radial arms 16c which are angularly spaced of 120°.

Two metal ogives 15 are connected to the opposite sides of the central portion 16a of the cylinder 16 and form together with said central portion 16a a torpedo shaped cylindrical electrode which is coaxially mounted within the tubular element 14 and defines together with the inner wall of the tubular element 14 an annular space for the flow of the material to be injected. In the central zone wherein the metal cylinder 16 is mounted, the material flows through apertures F defined by the supporting arms 16c.

The insulating ring 18 and the rings 19 which are respectively in contact with the outer surface and partially with the front surfaces of the peripheral ring 16b of cylinder 16 are made of thermoplastic material, preferably polyphenylenoxide (NORYL, trademark) and insulating rings 20, which have their inner annular surface flush with the inner wall of the tubular metal element 14, are preferably made of PTFE (TEFLON, trademark).

The high frequency signal is fed to the torpedo 15 by means of a coaxial cable 8 connected to the central portions 16a of cylinder 16 by a metal shank which is shielded by an insulating bush. Preferably the ogives 15 have a coating 15a of titanium oxide (black).

The device according to this embodiment has successfully operated with injection rates of 2.5 kg/sec with an average injection time of about 6-8 seconds. The material to be injected which was constituted by BMC or preferably KMC (trademark "kneaded molding compound"), was heated during the injection time up to about 80° C. from an initial temperature of about 20° C. and injected into a mold heated at about 150° C. The high frequency generator which was connected to the torpedo, acting as the high frequency source, had a frequency of 27 MHz with power of 150 w.

The material supplied to the accumulation cylinder by the metering cylinder is compacted in the inner chamber, a subatmospheric pressure being generated within the chamber to eliminate from the material air pockets which would create variations in the electrical field produced by the generator 9. The latter is preferably a 27.12 Mhertz radio-frequency generator. The high-frequency field is applied for a time, typically no longer than 15 seconds, until the material is brought to a temperature close to its polymerization temperature.

The injection is then effected directly into the die which is heated to the cross-linking temperature.

By virtue of the method and apparatus according to the invention, the material is treated with the high-frequency load in an atmosphere isolated from the outside, thus avoiding risks represented by the emanation of styrene typically included in the molding mass. The high-frequency load may also be metered to achieve uniform heating and to avoid the risk of prepolymerization.

I claim:

1. An injection molding apparatus for the injection molding of unsaturated polyester resin masses comprising:
   a metering cylinder provided with a piston for supplying a mass of resin material to an accumulation cylinder provided with a piston for injecting the resin mass into a die,
   a preheating unit connected between said accumulation cylinder and said die and comprising two half cylinders disposed on a common axis,
   an electrode support member connected between said two half cylinders and including a central cylindrical portion coaxial with said half cylinders and an outer peripheral ring portion connected in spaced relation to said cylindrical portion by means of spaced apart radial arms,
   two cylindrical electrodes connected to opposite sides of said central cylindrical portion, respectively, to define together with said central cylindrical portion a torpedo shaped cylindrical electrode extending through said half cylinders in coaxial spaced relation thereto and
   means for connecting said torpedo shaped cylindrical electrode to a high frequency generator for creating a high frequency field in resin material passing between said cylindrical electrode and said half cylinders to heat the resin material to a temperature close to its polymerization temperature.

* * * * *